United States Patent
Aldereguia et al.

(10) Patent No.: US 7,493,503 B2
(45) Date of Patent: Feb. 17, 2009

(54) PROGRAMMABLE THROTTLING IN BLADE/CHASSIS POWER MANAGEMENT

(75) Inventors: Alfredo Aldereguia, Cary, NC (US); Brian E. Bigelow, Apex, NC (US); Dhruv M. Desai, Cary, NC (US); Scott N. Dunham, Raleigh, NC (US); Nickolas J. Gruendler, Raleigh, NC (US); William G. Holland, Cary, NC (US); James E. Hughes, Apex, NC (US); Randolph S. Kolvick, Durham, NC (US); Challis L. Purrington, Raleigh, NC (US); Michael L. Scollard, Raleigh, NC (US); Gary R. Shippy, Cary, NC (US)

(73) Assignee: International Business Machines Corporation, Armonk ( * ) Notice: Subject to any disclaimer, the term of this patent is extended or adjusted under 35 U.S.C. 154(b) by 495 days.

(21) Appl. No.: 11/315,837

(22) Filed: Dec. 22, 2005

(65) Prior Publication Data

US 2007/0150757 A1  Jun. 28, 2007

(51) Int. Cl.
G06F 1/26 (2006.01)
(52) U.S. Cl. .................. 713/300; 713/321; 713/330; 713/340
(58) Field of Classification Search ............ 713/300
See application file for complete search history.

(56) References Cited

U.S. PATENT DOCUMENTS

| | | | |
|---|---|---|---|
| 4,528,458 A | 7/1985 | Nelson et al. | 307/64 |
| 4,586,179 A | 4/1986 | Sirazi et al. | 371/12 |
| 4,757,747 A | 7/1988 | Blatter et al. | 91/362 |
| 5,315,499 A | 5/1994 | Bilas et al. | 364/140 |
| 5,410,711 A | 4/1995 | Stewart | 395/750 |
| 5,560,033 A | 9/1996 | Doherty et al. | 395/800 |
| 5,640,529 A | 6/1997 | Hasbun | 395/430 |
| 5,656,869 A | 8/1997 | Gluskoter et al. | 307/64 |
| 5,664,004 A | 9/1997 | Durchman et al. | 455/466 |
| 5,664,089 A | 9/1997 | Byers et al. | 395/182.12 |
| 5,696,979 A | 12/1997 | Saitou | 395/750 |
| 5,850,514 A | 12/1998 | Gonda et al. | 395/185.08 |
| 6,175,927 B1 | 1/2001 | Cromer et al. | 713/300 |
| 6,181,677 B1 | 1/2001 | Valli et al. | 370/228 |
| 6,212,520 B1 | 4/2001 | Maruyama et al. | 707/10 |
| 6,269,239 B1 | 7/2001 | Hashem et al. | 455/69 |
| 6,304,978 B1 | 10/2001 | Horigan et al. | 713/322 |
| 6,452,809 B1 | 9/2002 | Jackson et al. | 361/796 |
| 6,498,716 B1 | 12/2002 | Salinas et al. | 361/610 |
| 6,510,529 B1 | 1/2003 | Alexander et al. | 714/11 |

(Continued)

*Primary Examiner*—Nitin C Patel
(74) *Attorney, Agent, or Firm*—H. Artoush Ohanian; Cynthia Byrd; Biggers & Ohanian, LLP (57) ABSTRACT

A method and system are disclosed to enable and control power reduction in a blade/chassis system. A "maximum power reduction" attribute is stored in the VPD of the blade (or can otherwise be input to or retrieved or calculated by the management entity). The management module of the chassis in which the blades and power supplies are located uses this information to manage the power reduction of blades when the system is operating in an over-subscription mode and a power supply fails. If throttling is required, the system knows the amount of power reduction available for each blade and controls the throttling by spreading it out among the blades in the system so that, ideally, no blade will cease operation altogether.

8 Claims, 4 Drawing Sheets

U.S. PATENT DOCUMENTS

| | | | |
|---|---|---|---|
| 6,528,901 B1 | 3/2003 | Canter | 307/11 |
| 6,542,997 B1 | 4/2003 | Rolls et al. | 713/324 |
| 6,577,875 B1 | 6/2003 | Brouwer | 455/522 |
| 6,594,771 B1 * | 7/2003 | Koerber et al. | 713/330 |
| 6,606,253 B2 | 8/2003 | Jackson et al. | 361/796 |
| 6,624,673 B2 | 9/2003 | Kim | 327/143 |
| 6,647,004 B2 | 11/2003 | Allen, Jr. et al. | 370/335 |
| 6,661,119 B2 | 12/2003 | Liu et al. | 307/71 |
| 6,785,827 B2 * | 8/2004 | Layton et al. | 713/300 |
| 6,968,470 B2 * | 11/2005 | Larson et al. | 713/340 |
| 7,043,647 B2 * | 5/2006 | Hansen et al. | 713/320 |
| 7,131,019 B2 * | 10/2006 | Lee | 713/340 |
| 2002/0108065 A1 | 8/2002 | Mares | 713/300 |
| 2003/0005339 A1 * | 1/2003 | Cohen et al. | 713/300 |
| 2003/0013475 A1 | 1/2003 | Yoshimura | 455/522 |
| 2003/0020333 A1 | 1/2003 | Ying | 307/38 |
| 2003/0114963 A1 | 6/2003 | Walker | 700/291 |
| 2003/0204759 A1 | 10/2003 | Singh | 713/320 |

* cited by examiner

PROGRAMMABLE THROTTLING IN BLADE/CHASSIS POWER MANAGEMENT

BACKGROUND OF THE INVENTION

1. Field of the Invention

This invention relates to management of power in blade computing systems.

2. Description of the Related Art

In the past, information handling systems, e.g., workstations, servers, etc. were essentially self-contained systems within an appropriate housing. For example, a desktop PC would consist of user interface elements (keyboard, mouse, and display) and a tower or desktop housing containing the CPU, power supply, communications components and the like. However, as demands on server systems and PC systems increased and with the increasing spread of networks and the services available through networks, alternate technologies have been proposed and implemented.

Blade computing is one such technology. A blade server provides functionality comparable to or beyond that previously available in a "free standing" or self-contained server, by housing a plurality of information handling systems in a compact space and a common housing. Each server system is configured to be present in a compact package known as a blade, which can be inserted in a chassis along with a number of other blades. At least some services for the blades, typically including power supply, are consolidated so that the services can be shared among the blades housed in common. As blade technology has advanced, blade architecture has been developed whereby servers are packaged as single boards and designed to be housed in chassis that provide access to all shared services. In other words, blade servers today are single board units that slide into a slot in a housing in which other like boards are also housed.

Similar to blade servers, desktop blades involve the configuration of the major components of a PC onto a single card, and then storing/housing many such cards in a single chassis or housing. As with server blades, the use of desktop blades allows centralized management and maintenance of power shared among the various blades.

In an IBM BladeCenter® and other blade/chassis systems, there are advantages to allowing the maximum possible density of blades within the chassis. Other than the size of the chassis itself, the only limitation on blade density is the amount of power consumed by the blades in the chassis. In a typical blade center system there are two power domains, each supported by two power supplies running in a shared, fully redundant mode. This two-supply system is considered fully redundant because if one of the supplies (the "non-redundant" or primary supply) fails, the other supply (the "redundant" or secondary supply) is of a size that allows it to provide sufficient power to fulfill the power demands of the entire domain. In other words, the "nominal power" of a single supply is sufficient to provide power for the entire domain. In practice, the power allocation is typically shared between the multiple supplies when all are functioning properly. When one of the power supplies fails, the portion of the power that it was providing is automatically shifted to the remaining supply.

As CPUs and other devices have increased their speed, their power demands have also increased. The aggregation of blades constructed with newer, more powerful and power-demanding CPUs may exceed the capacity of power provided by a single (non-redundant) power supply system, i.e., they may exceed the nominal power that can be provided by a single power supply; meanwhile the nominal power available by existing power supplies has not increased in a corresponding manner. While larger capacity power supplies could be utilized, space limitations within the chassis can be prohibitive. Thus, there is either a limit to the number of blades that can be used, or other power management strategies must be applied.

One solution has been to "oversubscribe" the number of blades available within the chassis, and utilize some of the spare capacity of the shared redundant power supplies for normal operations. Oversubscribing is the term used to describe the situation where aggregate power demand is greater than the non-redundant supply capacity (e.g., at nominal value of the power supply in a "1+1" redundant system, i.e., a system having one supply that can handle the complete load, plus one additional supply also capable of handling the complete load). In an oversubscription situation, the power needed to supply the subscribed blades will exceed the capacity of the non-redundant power supply and thus the power system is no longer fully redundant. This can threaten the overall operation of the system, since if a power supply failure occurs, the remaining supply may be overloaded and thus an entire domain of blades may not be able to remain operational.

Besides implementing a fully redundant policy, multiple levels of oversubscription can be defined. Recoverable-oversubscription is where the limit of power with redundant power supplies (recoverable-oversubscription limit) is greater than the power supply nominal value, but where recoverable action (e.g., throttling of blades) can be taken when a redundant supply is lost, such that the remaining power supply will not shut down. Non-recoverable-oversubscription is where the limit of power with redundant power supplies (non-recoverable-oversubscription limit) is greater than the power supply nominal value, but where sufficient recoverable action (e.g., throttling of blades) cannot be taken in a manner that will assure that the remaining power supply will not shut down.

When in oversubscription mode and a redundant power supply is lost, action must be taken very quickly to reduce the power demand or the power system will fail. One possible action is to power off one or more blades to thereby reduce the power demand. However, some blades are designed with programmable throttling such that their power consumption can be reduced, albeit with some loss of performance. It would be desirable to use this programmable throttling function for power reduction in the above-described situation when a redundant power supply is lost while operating in oversubscription. However, the chassis management entity in the prior art is not configured with sufficient information to enable power reduction via the programmable throttling. Different blades can have different mechanisms with different power reduction characteristics, and new blades may be released with new mechanisms and characteristics which would require an update to the chassis power management functions for them to be utilized by the chassis management entity when effecting power reduction.

Accordingly, it would be desirable to have a blade power management system whereby the amount of power reduction that a blade can withstand and still function was determined by the blade and utilized when determining which blades to reduce in power and by how much. Additionally, it would be desirable to provide a mechanism whereby the power is reduced within a very short window where the remaining power supply (or remaining power supplies) will provide the excess power needed for only this short period of time.

SUMMARY OF THE INVENTION

The present invention provides a method, system, and computer program product to enable and control power reduction in a blade/chassis system. A "maximum power reduction" attribute is stored in the VPD of the blade (or can otherwise be input to or retrieved or calculated by the management entity). The management module of the chassis in which the blades and power supplies are located uses this information to manage the power reduction of blades when the system is operating in an over-subscription mode and a power supply fails. If throttling is required, the system knows the amount of power reduction available for each blade and controls the throttling by spreading it out among the blades in the system so that, ideally, no blade will cease operation altogether. Mechanisms for rapid reduction of power are provided for situations in which redundant power is lost.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
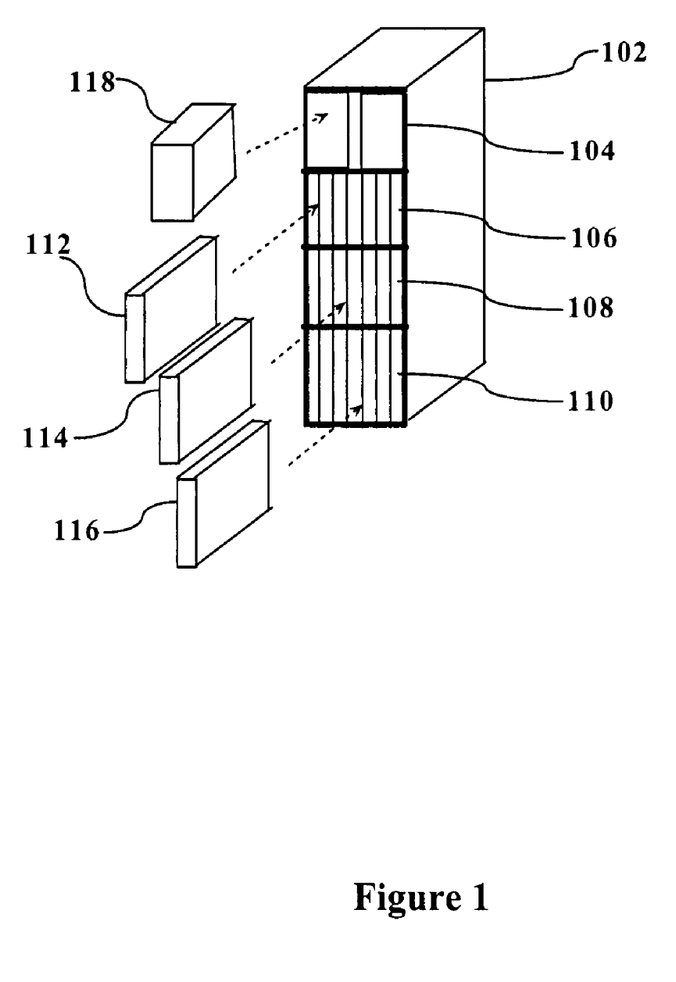
FIG. 1 illustrates an exemplary blade environment.

Referring now more particularly to the drawings, FIG. 1 illustrates an exemplary blade rack housing 102. While the view is simplified and certain elements to be described herein are not visible in FIG. 1, the rack housing 102 includes a plurality of chassis 104, 106, 108, and 110. Within the chassis, multiple blades, e.g., blades 112, 114, and 116, can be mounted. For example, in FIG. 1, blade 112 is illustrated as being mounted in chassis 106; blade 114 is shown as being mounted in chassis 108, and blade 116 is shown being mounted in chassis 110. A power supply 118 is shown being mounted in chassis 104. Although not shown, typically a Management Module is also included in the rack housing 102 and, in a known manner, manages the operations performed by the blade system.

Figure 2:
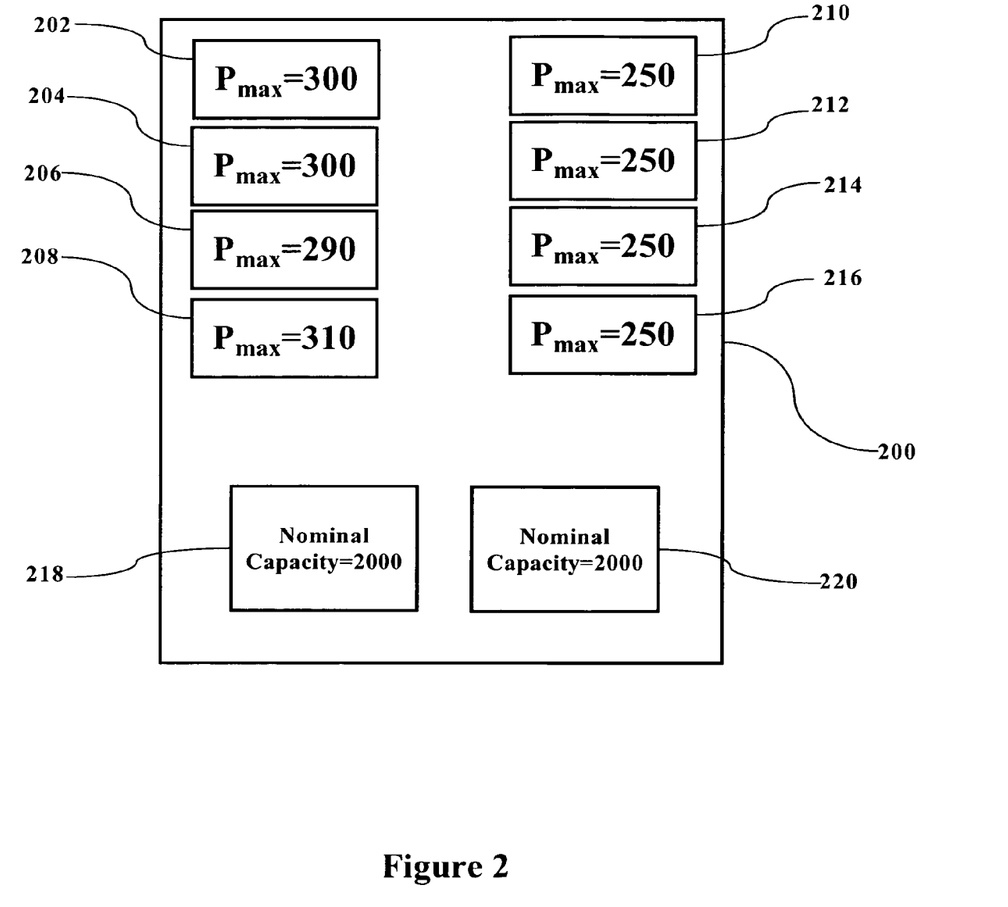
FIG. 2 is a block diagram that illustrates the allocation of power in a 1+1 redundant system as used in the present invention.

FIG. 2 is a block diagram that illustrates the allocation of power in a 1+1 redundant system as used in the present invention. The values given in FIG. 2 for the maximum power of each blade and the nominal capacity of the power supplies is given for the purpose of example only and it is understood that the present invention is not limited to the values illustrated in FIG. 2. Referring to FIG. 2, a simplified example of a rack 200 containing blades 202-216 is shown. Power supplies 218 and 220 provide power to the blades in rack 200 on a shared-allocation basis.

In the example of FIG. 2, blades 202 and 204 each are allocated 300 watts of power (maximum); blade 206 is allocated 290 watts of power (maximum); blade 208 is allocated 310 watts of power (maximum); and blades 210-216 are each allocated 250 watts of power (maximum). The maximum values are calculated based on the various options that may be installed on each blade. At any given time any of the blades may be drawing the maximum values; however, it is understood that there will also be times when they are drawing less power. In the example of FIG. 2, if all of the blades are subscribed simultaneously, 2200 watts of power would have to be allocated to run the blades at maximum power. This is 200 watts above the nominal power of either of the power supplies 218 or 220 individually, which means that the system is running in an oversubscription mode where additional power is being provided by the excess capacity of the redundant power supplies.

In accordance with the present invention, a maximum power reduction (MPR) attribute for each blade is identified and is utilized by the management module of the system to manage the amount of throttling performed when a throttle condition exists. As noted above, in the example of FIG. 2 the blade system is oversubscribed by 200 watts. In other words, if one of the power supplies 218 or 220 were to fail, the overall power being drawn by the blades in the aggregate would have to be reduced by 200 watts to enable the power supply to continue powering the blade system. As noted above, a method in the prior art for quickly reducing the power would be to completely shut down a sufficient number of blades to reduce the power requirement of the remaining functioning supply. In the example of FIG. 2, since each of the blades has a maximum power draw that exceeds the 200 watt oversubscription value, in the prior art systems, any one of the blades would be shut down and the remaining blades could be powered by the functioning power supply. This is problematic, however, in that the entire functionality of one of the blades is lost.

The present invention allows one or more of the blades to be throttled back by an amount that does not exceed the "maximum power reduction" value. This is a value that has been determined in advance at which a particular blade can continue to function and perform its primary duties while drawing a reduced amount of power.

Figure 3:
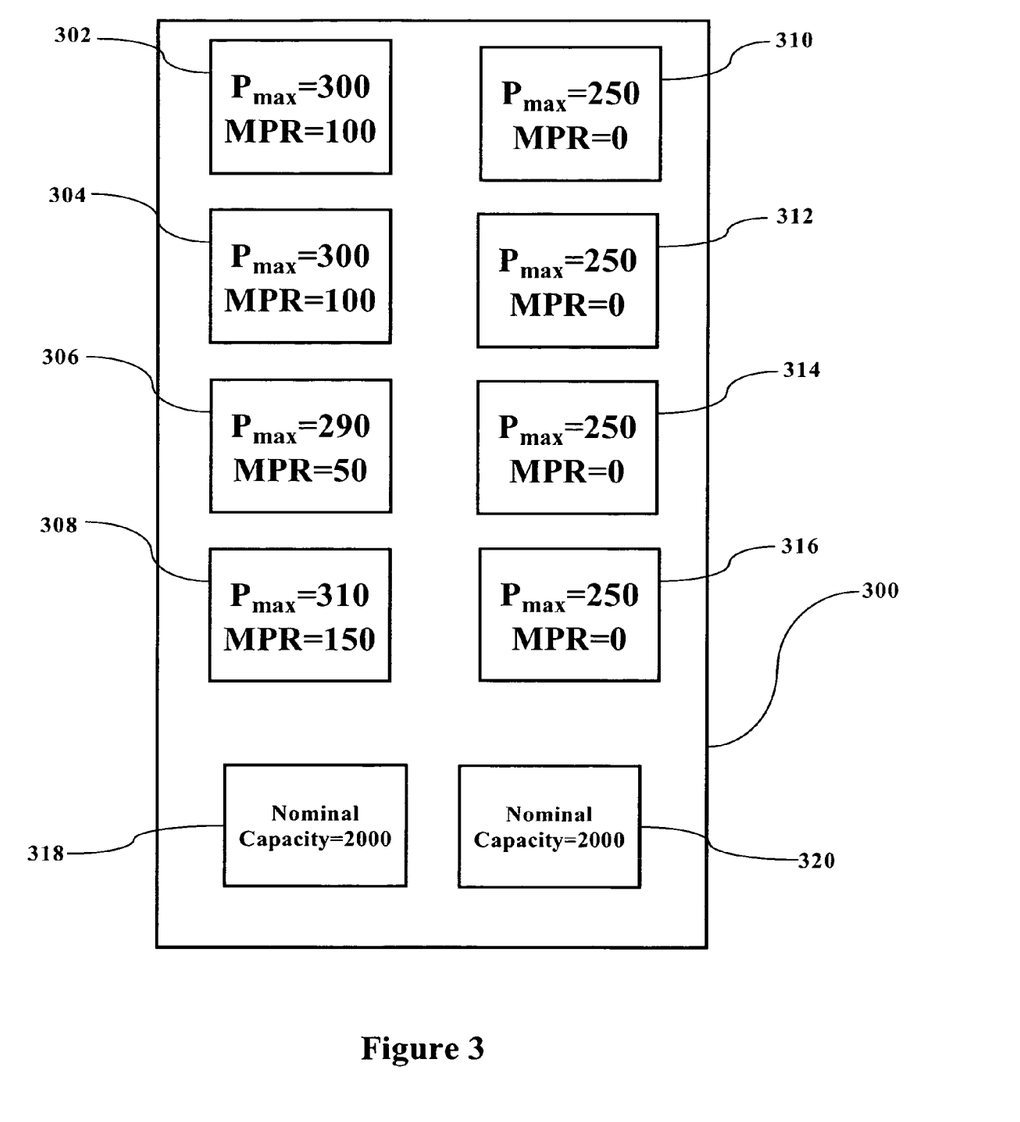
FIG. 3 illustrates the chassis illustrated in FIG. 2, with MPR values for each blade included.

FIG. 3 illustrates the chassis illustrated in FIG. 2, but with the MPR values for each blade included. The chassis of FIG. 3 includes power supplies 318 and 320. As can be seen, the MPR value for blades 302 and 304 is 100 watts for each blade; the MPR value for blade 306 is 50 watts; the MPR value for blade 308 is 150 watts; and the MPR values for blades 310-316 is 0 watts. In other words, blades 302 and 304 can reduce their power by 100 watts each and still continue to perform their functions; blade 306 can reduce its power draw by 50 watts and still continue to perform its functions; and blade 308 can reduce its power draw by 150 watts and still continue to perform its functions. Blades 310-316 cannot have their power reduced below their maximum value. This indicates that they are incapable of throttling or are performing important functions or are fully loaded, i.e., they cannot reduce their power. The MPR attributes can be provided in the VPD of each blade. This value can be static (set in manufacturing) or dynamically calculated by the blade based on installed blade options. For dynamic calculation, tables and algorithms for this calculation are self-contained within the blade. The blades can dynamically calculate their maximum power requirement by detecting the installed blade options, determining the options' power requirements from the table stored on the blade, and summing all the individual power requirements, thereby arriving at the total power requirement for the blade.

Figure 4:
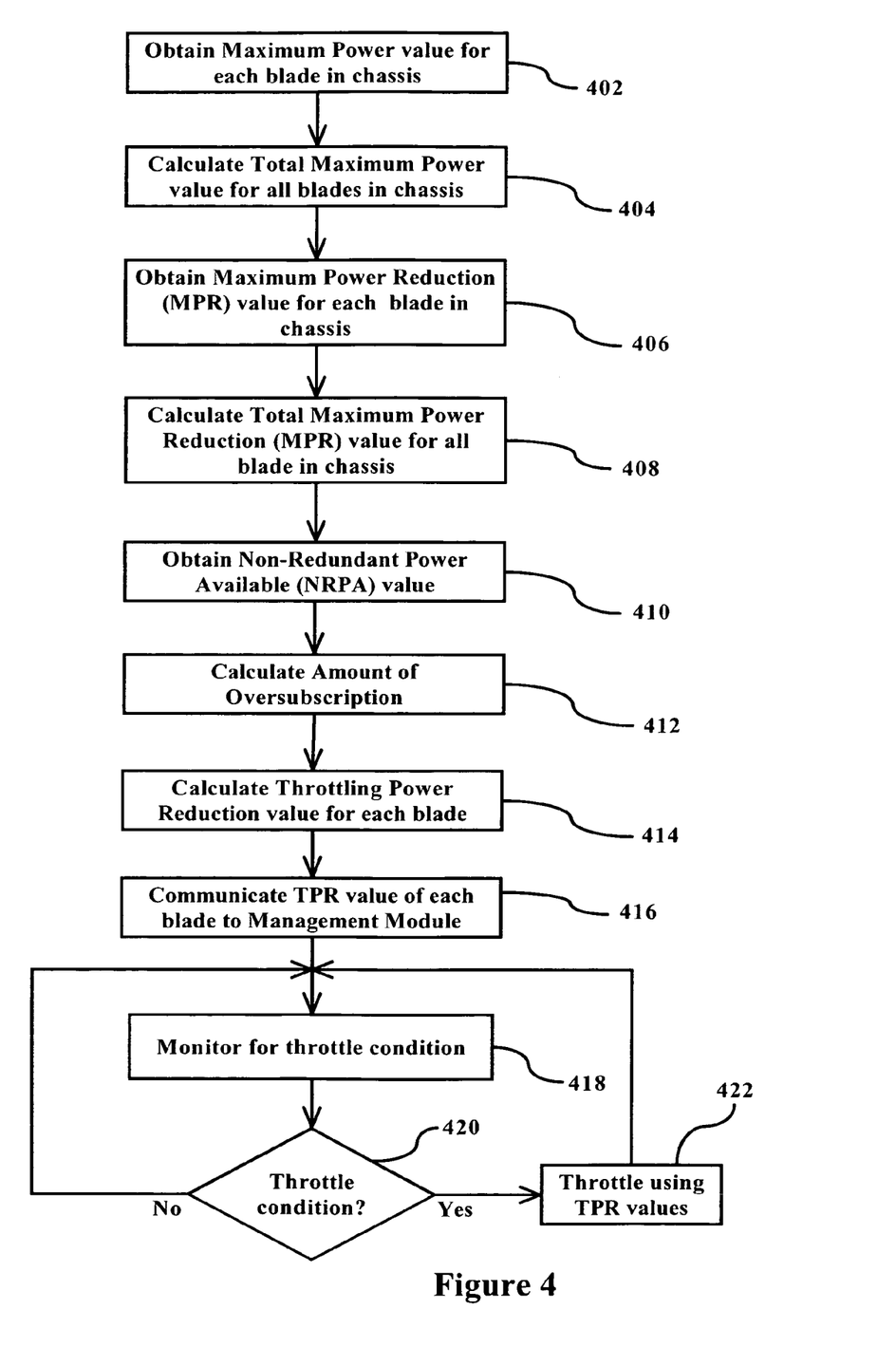
FIG. 4 is a flowchart illustrating the basic steps performed in accordance with the present invention.

FIG. 4 is a flowchart illustrating steps performed in accordance with the present invention. Referring to FIG. 4, at step 402 the maximum power ($P_{max}$) value for each blade in the chassis is obtained. As noted above, this information can be obtained from the VPD of the blade or could be dynamically calculated by the blade based on the installed blade options. At step 404, the total maximum power for all blades in the chassis is calculated by totaling up the maximum power value of the individual blades. In the example of FIG. 3, the total maximum power value for all blades in the chassis is 2200 watts.

At step 406, the MPR for each blade in the chassis is identified. Again, this can be obtained from the VPD of the blade or dynamically calculated by the blade based on installed blade options. At step 408, the total MPR value for all blades in the chassis is calculated. This is simply an addition step wherein all MPR's for all blades in the chassis are added. In the example of FIG. 3, the total MPR value for the blades in chassis 300 is 400 watts.

At step 410, the non-redundant power available (NRPA) value is identified. This is essentially the value of, in the example of FIG. 3, one of the power supplies, i.e., it is the value of power available if redundancy is lost.

At step 412, the amount of oversubscription is calculated. This is determined by subtracting the NRPA value from the total $P_{max}$ value for the blades in the chassis. In the example of FIG. 3, this calculation is 2200 watts−2000 watts=200 watts. At step 414, the throttling power reduction (TPR) value for each blade is calculated. One example of how to perform the calculation is to divide the MPR value of a blade by the Total MPR (TMPR) value for all blades, and then multiply that result by the amount of oversubscription. Thus, for example, for blade 302, the TPR value is: 100 watts (the MPR value of blade 302)÷400 watts (the TMPR value for all blades)=0.25 watts, multiplied by 200 watts (the amount of oversubscription). The TPR value for blade 302 is thus 50 watts. The same calculation holds true for blade 304, since the values of blade 304 are identical to the values of blade 302. Alternative calculations exist and could be customer selectable. For example, the throttle for blades could be calculated by subtracting the average non-redundant power available per blade (250 W in FIG. 3) from the Pmax (assuming that this value is not greater than the blade MPR).

For blade 306, the calculation is 50 watts÷400 watts=0.125 watts, multiplied by 200=25 watts. For blade 308, the calculation is 150 watts÷400 watts=0.375 watts×200=75 watts. The TPR value for blades 310-316 is 0 watts.

At step 420, the blade system is monitored for the occurrence of a throttle condition, that is, for example, a problem in power supply 320 that causes it to shut down. Upon this occurrence being sensed at step 420, the process proceeds to step 422, and the blades are throttled using the TPR values for each. The throttle level of each blade must minimally meet the TPR. This brings the total power draw of the blades down to the nominal value of the remaining power supply so that the system does not shut down altogether.

If, at step 420, a throttle condition has not been sensed, the process proceeds back to step 418 where monitoring takes place to sense throttle conditions.

Once throttling levels have been determined, a "performance percentage" can be derived, which is a numeric indication of the percentage of performance at which a particular blade is operating, after throttling. This can easily be done by configuring the blades with the appropriate algorithms and tables to calculate the performance percentage based upon the throttle amount needed to meet the TPR value. This will give an overall indication of the throttled performance as compared to the performance without throttling. This information can also be communicated to the management module so that the information will be available to a system user. Based on these performance numbers a system user may take appropriate action to insure that application(s) are performing at the required level.

There is a need to insure that when in oversubscription, the blades are quickly throttled independent of the chassis management entity (management module of MM). This can be accomplished by the MM pre-setting the TPR values in each blade. The blades then detect the loss of redundant power and automatically throttle to meet the preset TPR value. Once redundant power is returned, a blade remains in the throttled condition until the chassis management entity issues a command for it to unthrottle. This ensures that viability of the power system has been validated by the chassis management entity prior to the unthrottling of the throttled blades.

Alternatively, for systems where the blades are not capable of detecting the loss of redundant power, the chassis management module may be used to trigger the blades to throttle. However, when this is done it is prudent to insure that a loss of the chassis management module will not cause a power failure when there is a loss of redundant power. To protect the power domain during periods of loss of the power monitoring management system itself (e.g., if the management module ceases operation), the blades can be configured to dynamically monitor for the loss of the management entity function, and in such a case, automatically throttle to meet the pre-set TPR values until such time as the management module can be brought back into operation. One configuration to enable this function would be to provide a "watchdog timer" between the management module and the blades. The timer will monitor communications between the management module and the blades, and if there has been no communication from the management module for a predetermined period of time, it can be presumed that the management module is experiencing difficulty and the blades can automatically then be put into a throttling mode. The management module could be configured to send the command out at a frequency such that, without a failure, the timer would be reset multiple times within a timer window. A dummy command could be sent if a normal command was not ready to be sent within the given time period. Thus, a loss of a single command (or response) would not be sufficient for triggering the timer. Once the loss is detected, the action for power reduction (e.g., throttling) is initiated, just as in the case of a loss of redundant power. The notification of the power reduction would be continued and forwarded when the management module is again functional. Further, while the management module is in the non-operational state, the blades can be configured to perform a periodic test to determine if the management entity has returned to operation. Exit from the throttled state and reinitiation of the watchdog timer can be accomplished by configuring the management module to issue an explicit command to each blade to "unthrottle".

The present invention can also be implemented using hardware throttling techniques. For example, some Intel devices utilize a "FORCEPR#" pin, and driving this pin can throttle the processors when a power loss is detected which necessitates prompt throttling. The Early Power Off Warning (EPOW) from the system power supplies can be used to determine that the amount of available power is decreasing, and the warning can drive the FORCEPR# pin (or similar pin on a non-Intel processor) and thereby trigger the throttling of each processor by the TPR value. The system can be configured to issue a high priority interrupt to the BMC when the EPOW event occurs. This allows the FORCEPR# action to be asserted quickly, within the short window provided by EPOW.

Although the descriptions herein refer to the use of the present invention with blade computers (server blades, desktop blades, etc.), the present invention as claimed is not so limited. The present invention may be used with other components, including "blade-like" devices that are not generally considered servers in the IT sense, drop-insert routing of telecom circuits, voice processing blades, blades that packetize voice from telecom circuits to a packet network, as well as switch modules, integrated switches and the like.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage on a disk drive located in a rack housing. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, this disclosure supports combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for power management in a blade computing system, comprising:
   calculating a Throttling Power Reduction (TPR) value for each blade in the blade computing system;
   presetting said TPR value in each blade by a Management Module managing the operation of said blade computing system;
   monitoring, by a blade, a functional status of said Management Module; and
   automatically throttling each blade to minimally meet the preset TPR value when said monitoring of the functional status of said Management Module reveals a loss in function of said Management Module.

2. The method of claim 1, wherein the calculation of the TPR for each blade comprises:
   obtaining the Maximum Power Reduction (MPR) value for each blade in the blade computing system;
   calculating the Total Maximum Power Reduction (TMPR) value for the blade computing system;
   calculating the amount of over-subscription of said blade computing system;
   dividing the MPR value of each of said blades by the TMPR to obtain an MPR quotient for each blade; and
   multiplying said amount of over-subscription by the MPR quotient for each blade, thereby obtaining the TPR for each blade.

3. The method of claim 2, wherein said MPR value for each blade is stored in the Vital Product Data (VPD) of each blade.

4. The method of claim 2, wherein said MPR value is dynamically calculated for each blade, said dynamic calculation being accomplished by:
   configuring each blade with a table storing power requirements for blade options;
   detecting blade options installed on each blade; and
   determining the power requirements for each option on each blade based on the stored power requirements and the detected blade options; and
   summing the power requirements for each option on each blade, with the sum for each blade being its MPR value.

5. A system for power management in a blade computing system, comprising:
   means for calculating a Throttling Power Reduction (TPR) value for each blade in the blade computing system;
   means for presetting said TPR value in each blade by a Management Module managing the operation of said blade computing system;
   means for monitoring, by a blade, a functional status of said Management Module; and
   means for automatically throttling each blade to minimally meet the present TPR value when said monitoring of the functional status of said Management Module reveals a loss in function of said Management Module.

6. The system of claim 5, wherein means for calculating the TPR for each blade comprises:
   means for obtaining the Maximum Power Reduction (MPR) value for each blade in the blade computing system;
   means for calculating the Total Maximum Power Reduction (TMPR) value for the blade computing system;
   means for calculating the amount of over-subscription of said blade computing system;
   means for dividing the MPR value of each of said blades by the TMPR to obtain an MPR quotient for each blade; and
   means for multiplying said amount of over-subscription by the MPR quotient for each blade, thereby obtaining the TPR for each blade.

7. The system of claim 6, wherein said MPR value for each blade is stored in the Vital Product Data (VPD) of each blade.

8. The system of claim 6, wherein said MPR value is dynamically calculated for each blade, said dynamic calculation being accomplished by:

means for configuring each blade with a table storing power requirements for blade options;
means for detecting blade options installed on each blade;
means for determining the power requirements for each option on each blade based on the stored power requirements and the detected blade options; and
means for summing the power requirements for each option on each blade, with the sum for each blade being its MPR value.

* * * * *